US012762204B2

(12) United States Patent
Tang et al.

(10) Patent No.: US 12,762,204 B2
(45) Date of Patent: Oct. 13, 2026

(54) METHOD AND APPARATUS FOR PROCESSING SPARSE DATA

(71) Applicant: Beijing Tsingmicro Intelligent Technology Co., Ltd., Beijing (CN)

(72) Inventors: Shibin Tang, Beijing (CN); Peng Ouyang, Beijing (CN)

(73) Assignee: Beijing Tsingmicro Intelligent Technology Co., Ltd., Beijing (CN)

( * ) Notice: Subject to any disclaimer, the term of this patent is extended or adjusted under 35 U.S.C. 154(b) by 1094 days.

(21) Appl. No.: 17/904,360

(22) PCT Filed: May 27, 2021

(86) PCT No.: PCT/CN2021/096490
§ 371 (c)(1),
(2) Date: Aug. 16, 2022

(87) PCT Pub. No.: WO2022/134465
PCT Pub. Date: Jun. 30, 2022

(65) Prior Publication Data

US 2023/0068450 A1 Mar. 2, 2023

(30) Foreign Application Priority Data

Dec. 24, 2020 (CN) ......................... 202011552162.8

(51) Int. Cl.
*G06F 17/16* (2006.01)
*G06F 17/15* (2006.01)

(52) U.S. Cl.
CPC ............ *G06F 17/16* (2013.01); *G06F 17/153* (2013.01)

(58) Field of Classification Search
CPC ................................ G06F 17/16; G06N 3/063
See application file for complete search history.

(56) References Cited

U.S. PATENT DOCUMENTS

| | | | | |
|---|---|---|---|---|
| 11,392,829 | B1 * | 7/2022 | Pool | G06N 3/0495 |
| 2021/0042617 | A1 * | 2/2021 | Chinya | G06N 3/048 |
| 2021/0117761 | A1 * | 4/2021 | Ro | G06N 3/082 |
| 2021/0182666 | A1 * | 6/2021 | Han | G06F 17/16 |

FOREIGN PATENT DOCUMENTS

| | | |
|---|---|---|
| CN | 109993297 | 7/2019 |

OTHER PUBLICATIONS

J. Lee, S. Kang, Y. Yu, Y.-Y. Jo, S.-W. Kim and Y. Park, "Optimization of GPU-based Sparse Matrix Multiplication for Large Sparse Networks," 2020 IEEE 36th International Conference on Data Engineering (ICDE), Dallas, TX, USA, May 2020, (Year: 2020).*
WIPO, International Search Report for PCT/CN2021/096490, Sep. 27, 2021.

* cited by examiner

*Primary Examiner* — Andrew Caldwell
*Assistant Examiner* — Phat N Le
(74) *Attorney, Agent, or Firm* — Hodgson Russ LLP

(57) ABSTRACT

The disclosure provides a method and apparatus for processing sparse data. The method is applied to a reconfigurable processor that includes a PE array, and the PE array includes P×Q PE units. The method includes: dividing a sparse weight matrix to be calculated into at least one unit block; grouping a plurality of unit blocks into a computing group; and obtaining an effective weight address corresponding to each effective weight in the computing group.

14 Claims, 4 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | | | | B | | | | | | | | C | | | D |

| | | | |
|---|---|---|---|
| 1 | 0 | 0 | 0 |
| 0 | 0 | 0 | 0 |
| 0 | 0 | 0 | 0 |
| 0 | 0 | 0 | 0 |
| 2 | 4 | 0 | 0 |
| 0 | 0 | 3 | 5 |

METHOD AND APPARATUS FOR PROCESSING SPARSE DATA

CROSS-REFERENCE TO RELATED APPLICATIONS

This application is the U.S. national phase application of International Application No. PCT/CN2021/096490 filed on May 27, 2021, which claims priority to Chinese Patent Application No. 202011552162.8, filed on Dec. 24, 2020, the entire disclosure of which is incorporated herein by reference.

TECHNICAL FIELD

The disclosure relates to the field of reconfigurable processor, and in particular to a method and an apparatus for processing sparse data in accelerating operation of a reconfigurable processor.

BACKGROUND

Neural network computation based on deep learning is widely used in image detection, image recognition, speech recognition and other fields. A lot of storage resources, computing resources and bandwidth resources are consumed by convolution computation and fully-connected computation in the neural network, which become a bottleneck in the implementation of the neural network on smart devices such as smart cameras, smart headphones and smart speakers. The reconfigurable processor may be applied to neural network computation based on deep learning.

The sparsity technology is a technology that restricts a ratio of non-zero weights in the weights used in the convolution computation and the fully-connected computation through training, to reduce storage overhead of storage weights. Meanwhile, the studies found that, the sparsity may also be used to reduce a number of multiplications and additions in the convolution computation and the fully-connected computation, and to reduce the bandwidth of data transmission. However, random sparse weights during the training are not conducive to fully mining hardware computing resources and bandwidth resources.

The sparsity technology includes regular sparsity. For example, in the related art, a method for aggregated regular sparsity is provided. However, the method for aggregated regular sparsity has shortcomings in the algorithm accuracy and the sparse rate.

SUMMARY

According to a first aspect of the disclosure, a method for processing sparse data is applied to a reconfigurable processor, in which the reconfigurable processor includes a PE array, and the PE array includes P×Q PE units. The method includes: dividing a sparse weight matrix to be calculated into at least one unit block; grouping a plurality of unit blocks into a computing group; and obtaining an effective weight address corresponding to each effective weight in the computing group.

According to a second aspect of the disclosure, an apparatus for processing sparse data includes a reconfigurable processor and a memory configured to store instructions executable by the processor. The reconfigurable processor includes a PE array, and the PE array includes P×Q PE units. The processor is configured to divide a sparse weight matrix to be calculated into at least one unit block; group a plurality of unit blocks into at least one computing group; and obtain an effective weight address corresponding to each effective weight in the computing group.

DETAILED DESCRIPTION

Figure 1:
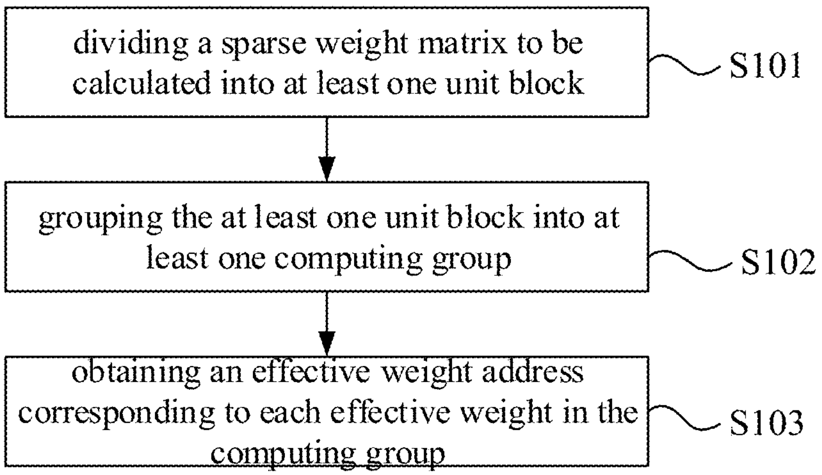
FIG. 1 is a flowchart of a method for processing sparse data in accelerating operation of a reconfigurable processor according to a first embodiment of the disclosure.

In order to more clearly understand technical features, objectives and effects of the disclosure, specific embodiments of the disclosure are described with reference to the accompanying drawings. The same reference numerals in each figure indicate components with the same structure, or components with similar structures but the same function.

The term "schematically" herein means "serving as an example, instance or illustration", and any illustration or embodiment described as "schematically" in the disclosure should not be construed as a more preferred or advantageous technical solution. In order to make the drawings concise, only portions related to the exemplary embodiments are schematically presented in each of the drawings, which do not represent an actual structure and a true ratio of the product.

FIG. 1 is a flowchart of a method for processing sparse data in accelerating operation of a reconfigurable processor according to a first embodiment of the disclosure. The reconfigurable processor includes a processing element (PE) array, the PE array includes P×Q PE units.

The weight matrix is used in the convolution computation and the fully-connected computation in the neural network. Under a premise of ensuring proper learning accuracy, a number of neurons in the neural network should be as small as possible (i.e., a sparse structure) to reduce costs, improve the robustness and enhance the accuracy. Therefore, generally, the sparsity technology is used to constrain the ratio of non-zero weights in the weight matrix to reduce the storage overhead of storing the weights, reduce the number of multiplications and additions in the computation, and reduce the bandwidth of data transmission.

However, the disclosure provides a hardware-friendly sparsity method by grouping and accelerated hardware design, to facilitate convergence of the algorithm accuracy and provide a high sparse rate in the same algorithm accuracy.

In detail, as illustrated in FIG. 1, the method for processing sparse data for accelerating operation of a reconfigurable processor according to the disclosure includes the following steps.

At S101, a sparse weight matrix to be calculated is divided into at least one unit block.

In an embodiment, the sparse weight matrix may be divided into at least one unit block by taking P×Q as a division unit along a row direction and a column direction of the sparse weight matrix. Each unit block may include at least one effective weight.

For example, for an M×N weight matrix, the weight matrix may be divided into (M/P)×(N/Q) unit blocks with P×Q as a granularity.

Figure 5:
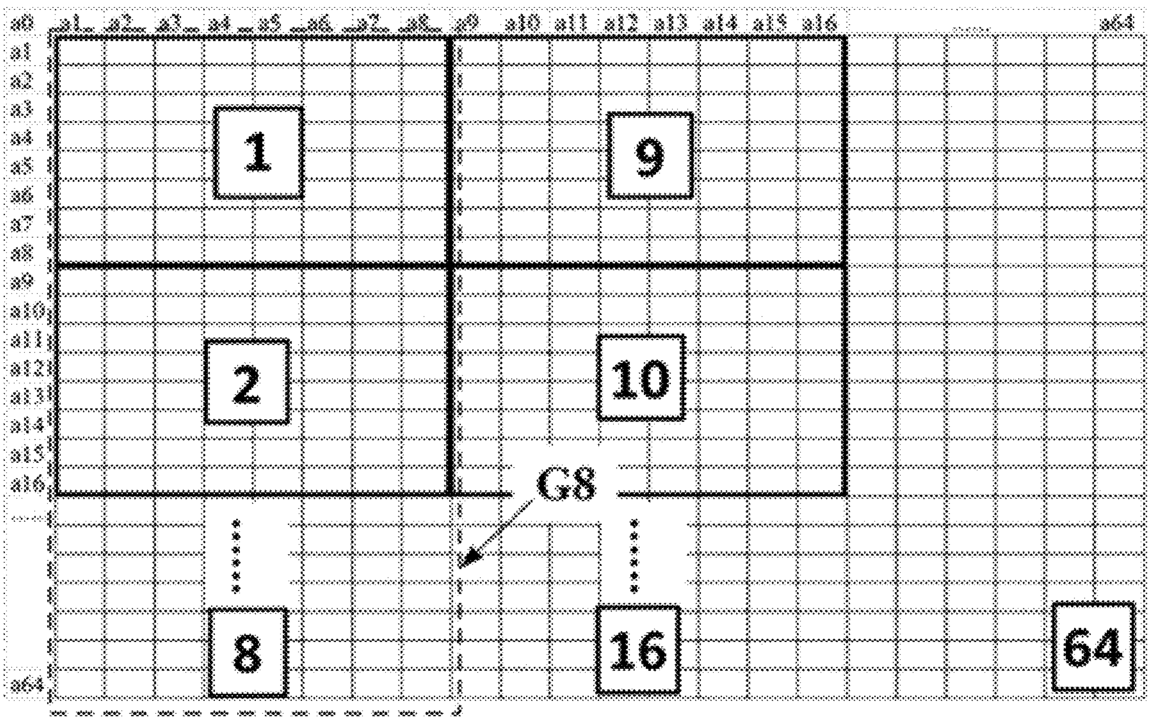
FIG. 5 is a schematic diagram illustrating grouping unit blocks of a sparse weight matrix according to an embodiment of the disclosure.

In a specific example, as illustrated in FIG. 5, when the PE array includes 8×8 PE units (that is, P=8, Q=8), a 64×64 weight matrix (that is, M=64, N=64) may be divided into (64/8)×(64/8)=64 unit blocks, namely the unit block 1 to the unit block 64 (each unit block is represented by a number in each box of the figure).

As illustrated in FIG. 5, 8×8 units are included in each unit block among the divided unit blocks 1 . . . 64 (corresponding to the divided areas 1, 2 . . . 64), so that the entire 64×64 weight matrix is divided into 8×8 matrices.

At S102, the at least one unit block is grouped into at least one computing group.

The unit blocks may be grouped into at least one computing group along a column direction or a row direction of the sparse weight matrix. For ease of description, in the following text, the description is given by grouping the unit blocks into the at least one computing group along the column direction.

When the unit blocks are grouped into the at least one computing group, a total number of effective weights (that is, non-zero weights) in all the unit blocks in each computing group should not exceed (P×Q)/2.

When P×Q PE units are used to process each computing group, in addition to the effective weights, ½ of the P×Q PE units need to be reserved as address storage locations of the effective weights.

Therefore, grouping the unit blocks into the at least one computing group may be implemented by the following steps:

- grouping the unit blocks in the sparse weight matrix into the at least one computing group in the column direction of the sparse weight matrix, each group including at least one unit block (for example, for N columns in an M×N weight matrix, M unit blocks in each column may be divided into a group, and N groups are obtained; or it is also possible to group less than M unit blocks or even one unit block in each column into a group);
- determining whether a total number of effective weights in each group of unit blocks is more than (P×Q)/2;
- when the total number of effective weights in each group of unit blocks is more than (P×Q)/2, splitting the group into two groups evenly in the column direction of the sparse weight matrix;
- repeating the above determining and splitting steps until the total number of effective weights in each group of unit blocks in the sparse weight matrix is less than (P×Q)/2; and
- obtaining a minimum number of unit blocks in each group in the sparse weight matrix as a group division number n, and dividing the sparse weight matrix in the column direction of the sparse weight matrix into the at least one computing group according to the group division number n.

Through the groups, a constraint matrix K×Q may be obtained, where K=nP. Therefore, for an MXN weight matrix, K×Q may be used as a granularity to divide the weight matrix into (M/K)×(N/Q)=(M/(n×P))×(N/Q) sub-matrices.

For example, taking the example in FIG. 5 as an example, the 64×64 weight matrix includes a total of 8 columns, and each column includes 8 unit blocks. The unit blocks of each column are served as a group along the column direction of the weight matrix, and 8 groups in total are obtained, including a first group of unit blocks 1-8, a second group of unit blocks 9-16, and a third group of unit blocks 17-24, a fourth group of unit blocks 25-32, a fifth group of unit blocks 33-40, a sixth group of unit blocks 41-48, a seventh group of unit blocks 49-56, and an eighth group of unit blocks 57-64.

Then, it is determined whether a total number of effective weights in each group of unit blocks is more than (P×Q)/2=(8×8)/2=32.

In the disclosure, it is assumed that a total number of effective weights in the first group of unit blocks 1-8 is 20, a total number of effective weights in the second group of unit blocks 9-16 is 15, a total number of effective weights in the third group of unit blocks 17-24 is 10, a total number of effective weights in the fourth group of unit blocks 25-32 is 31, a total number of effective weights in the fifth group of unit blocks 33-40 is 30, and a total number of effective weights in the sixth group of unit blocks 41-48 is 28, a total number of effective weights in the seventh group of unit blocks 49-56 is 8, and a total number of effective weights in the eighth group of unit blocks 57-64 is 11.

Since the total number of effective weights in each group of unit block does not exceed 32, there is no need to further split each group. Therefore, the number of unit blocks currently contained in each group (i.e., 8) is taken as the group division number n, that is, n=8, and the weight matrix is divided into 8 computing groups along the column direction of the weight matrix according to the group division number n=8.

Figure 6:
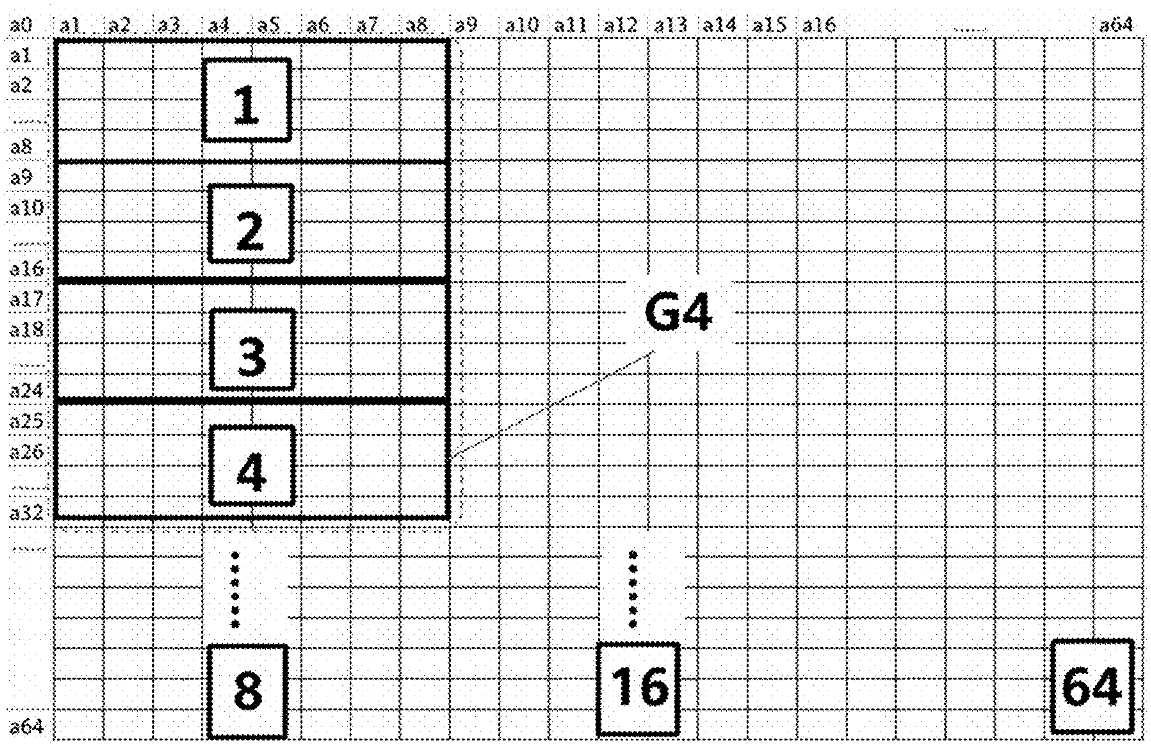
FIG. 6 is another schematic diagram illustrating grouping unit blocks of a sparse weight matrix according to an embodiment of the disclosure.

As illustrated in FIG. 6, FIG. 6 is another example of grouping the unit blocks of the weight matrix into computing groups.

FIG. 6 also shows a 64×64 weight matrix, which includes 64 8×8 unit blocks. It is possible to first divide the unit blocks of each column into one group in a manner similar to that in FIG. 5, to obtain 8 groups in total.

However, in FIG. 6, it is assumed that the total number of effective weights in the first group of unit blocks 1-8 is 56, which exceeds (P×Q)/2=(8×8)/2=32. Therefore, along the column direction of the weight matrix, the first group of unit blocks 1-8 is split into two groups, where each group contains 4 unit blocks, that is, a first sub-group contains unit blocks 1-4, and a second sub-group contains unit blocks 5-8. Since the total numbers of effective weights in other groups of unit blocks (except for the first group of unit blocks) are less than 32, other groups are no longer split.

As a result, in the current group of the weight matrix, the minimum number of unit blocks included in each group is 4. Therefore, the group division number is set to n=4. Then, the weight matrix may be divided into 16 computing groups in total along the column direction of the weight matrix according to the group division number n=4.

Different grouping strategies are flexibly selected according to different engineering application requirements. In the example of FIG. 5, eight unit blocks are grouped into a computing group, denoted as G8, and each G8 area contains 8 8×8 unit blocks. In the example of FIG. 6, four unit blocks are grouped into a computing group, denoted as G4, and each G4 area contains 4 8×8 unit blocks.

Further, in the neural network computation:

- for a weight matrix of fully-connected computation, M=fo, N=fi, where fo is a number of channels for output features, and fi is a number of channels for input features.
- for a convolution weight template of convolution computation, M=fo, N=kx*ky*fi, where fo is a number of channels for output features, and fi is a number of channels for input features; kx, ky are sizes of the convolution template.

Therefore, the grouping method for sparsity adopted in the disclosure is suitable for weight sparsity in the convolution computation and the fully-connected computation at the same time. In addition, compared to the aggregated regular sparsity in the related art, the hardware-friendly grouping strategy for sparsity adopted in the disclosure is more conducive to the convergence of algorithm accuracy, and provides a higher sparse rate under the same algorithm accuracy.

At S103, an effective weight address corresponding to each effective weight in the computing group is obtained.

In an embodiment, obtaining the effective weight address may be performed by the following ways:

- reading each of effective weights in the computing group sequentially from the PE array; and
- determining a number of zero weights spaced between a current effective weight and a previous effective weight as an effective weight address of the current effective weight, and storing the number of zero weights into a storage address corresponding to the current effective weight of the computing group.

It should be noted that if the current effective weight is located at a starting point of the computing group, the spaced number (i.e., effective weight address) is set as 0.

In the disclosure, a sparse coding method is used to store the sparse weight matrix, where the number spaced between the effective weights is used as the effective weight address to realize compression of the weight matrix. For example, in the case of G8 (each computing group includes eight unit blocks) as illustrated in FIG. 5, a 4 times compression effect may be achieved.

This sparse matrix storage format is described with reference to FIG. 7 hereafter.

Figures 7, 8, 9:
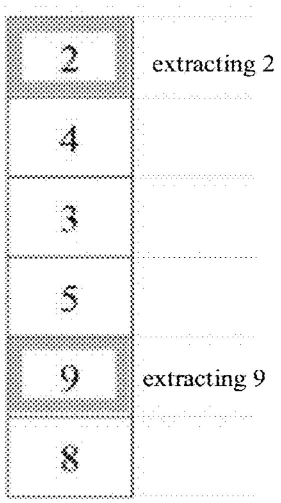
FIG. 7 is a schematic diagram illustrating an example storage vector in a sparse matrix storage format according to an embodiment of the disclosure.
FIG. 8 is a schematic diagram illustrating an example matrix in a sparse matrix storage format according to an embodiment of the disclosure.
FIG. 9 is a schematic diagram illustrating an example feature vector in a sparse matrix storage format according to an embodiment of the disclosure.

FIG. 7 exemplarily shows a 16-bit vector, in which grids marked by numbers A, B, C and D represent effective weights, and blank grids represent zero weights. That is, the vector may be expressed as A000B000000C00D.

As illustrated in FIG. 7, an effective weight A is a starting point, and its effective weight address is set to 0. The number of zero weights between the effective weight B and the previous effective weight A is 3, so its effective weight address is 3. The number of zero weights between the effective weight C and the previous effective weight B is 7, so its effective weight address is 7. The number of zero weights between the effective weight D and the previous effective weight C is 2, so its effective weight address is 2. Therefore, according to the storage format of the disclosure, the example vector may be expressed as (A, 0) (B, 3) (C, 7) (D, 2).

Compared to the vector in an original storage format of A000B0000000C00D, the storage format according to the disclosure may effectively reduce the required storage capacity and reduce the bandwidth of data transmission.

As illustrated in FIG. 8, FIG. 8 exemplarily shows a 6×4 sparse matrix. The storage format of the sparse matrix is as follows.

Starting from the upper left corner of the matrix, according to an order from top to bottom and from left to right, the effective weight address of each effective weight in the matrix is obtained in turn. As illustrated in FIG. 8, there are effective weights (non-zero weights) 1, 2, 4, 3, and 5 (marked by thick shaded boxes in the figure) in the matrix. According to the order from top to bottom and from left to right, the number of zero weights spaced between the effective weight 1 in the upper left corner and its previous effective weight (i.e., the starting point here) is 0. The number of zero weights spaced between the effective weight 2 and the effective weight 1 is 3. The number of zero weights spaced between the effective weight 4 and the effective weight 2 is 5, and so on. Finally, the sparse coding of the matrix is obtained as (1,0)(2,3)(4,5)(3,6)(5,5), where the former number in parentheses indicates the effective weight, and the latter number indicates the effective weight address of the effective weight.

In a specific hardware acceleration design, a P×Q MAC (multiply-adding) array may be used to accelerate convolution and sparsity operations.

In the normal mode, the P×Q MAC array may read one P-dimensional input feature vector and P×Q weights at each time, to calculate a Q-dimensional output feature vector.

In the sparsity mode of the disclosure, the P×Q MAC array may read a K-dimensional input feature vector and (P×Q)/2 effective weights after the sparsity each time. In the computation, the effective weight address of each effective weight (that is, a spaced number value of the zero weights in the storage format) may be extracted to restore the constraint matrix K×Q and obtain the vector value corresponding to each effective weight in the K-dimensional input feature vector. Then, the Q-dimensional output feature vector is calculated.

When the constraint matrix K×Q is restored, the sparse decoding may be performed as follows: according to the sparse coding, the K×Q matrix is complemented from top to bottom and from left to right, starting from the upper left corner of the matrix.

Taking the 6×4 matrix in FIG. 8 as an example, as described above, the sparse coding is (1,0)(2,3)(4,5)(3,6)(5, 5).

At this time, the above sparse code is decoded into effective weights and effective weight addresses. In G8 of FIG. 5, the constraint matrix K×Q=8×8×8, which includes $2^9$ units in total, so the address length may be 9 bits. It should be noted that in the constraint matrix K×Q, each column only allows at most P effective weights so as to adapt to the P×Q MAC array.

Then, for example, the effective weight and a sequence number where the effective weight is located in a column of the constraint matrix K×Q are read through a logic circuit. According to the sequence number of the located column, a value in the K-dimensional input feature vector is taken out from an item with the corresponding sequence number. Each effective weight in this column is multiplied and added with the value taken out from the item with the corresponding sequence number in the input feature vector to obtain the output value. The above operations are repeated for each column of the K×Q matrix in sequence, and Q output values are obtained in total, to generate the Q-dimensional output feature vector.

Next, referring to the specific examples in FIG. 8 and FIG. 9, the above steps are described in detail.

As illustrated in FIG. 8, there are two effective weights in the first column of the 6×4 matrix. The first effective weight is 1, and its serial number in this column is 1. The second effective weight is 2, and its serial number in this column is 5. Therefore, according to the above sequence numbers, the values corresponding to the sequence numbers 1 and 5, namely 2 and 9, are respectively taken out from the input feature vector shown in FIG. 9. Then, all the effective weights 1 and 2 in the first column are multiplied and added with the values 2 and 9 taken out from the input feature vector with the same sequence numbers, to obtain the output value 1×2+2×9=20.

Referring to the second column of the matrix shown in FIG. 8, there is only one effective weight 4 in the second column, and its sequence number is 5. Therefore, the value 9 is taken out from the item with the sequence number 5 in the input feature vector to obtain the output value 4×9=36.

In the third column of the matrix, the effective weight 3 is extracted, and its serial number is 6, and then the value 8 taken out from the item with the serial number 6 in the input feature vector is determined for performing multiplication and addition operation to obtain the output value 3×8=24.

In the fourth column of the matrix, the effective weight 5 is extracted, and its serial number is 6, and then the value 8 taken from the item with the serial number 6 in the input feature vector is determined for performing multiplication and addition operation to obtain the output value 5×8=40.

After the above operations, four output values are obtained, i.e., 20, 36, 24, 40, and the output feature vector (20, 36, 24, 40) is generated.

Figure 2:
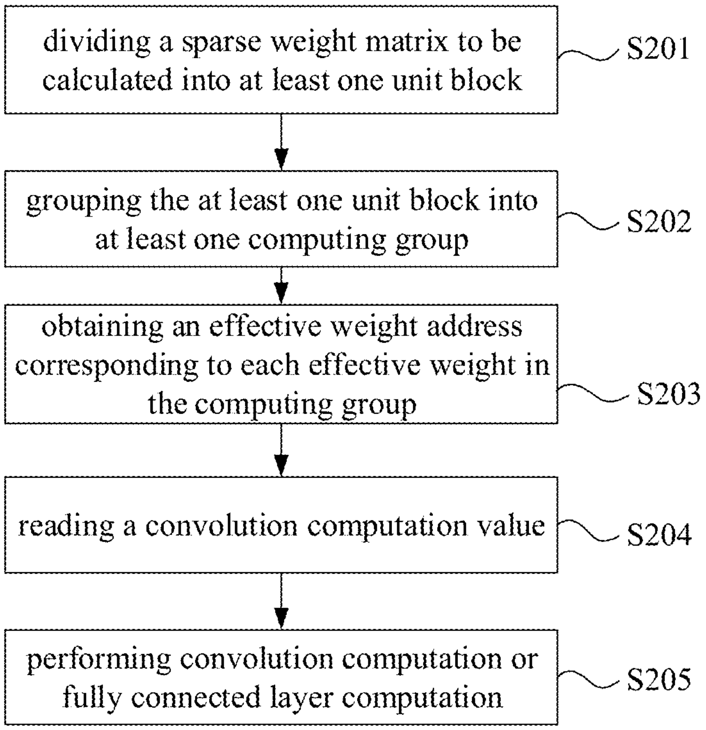
FIG. 2 is a flowchart of a method for processing sparse data in accelerating operation of a reconfigurable processor according to a second embodiment of the disclosure.

FIG. 2 is a flowchart of a method for processing sparse data in accelerating operation of a reconfigurable processor according to a second embodiment of the disclosure. The reconfigurable processor includes a PE array, where the PE array includes P×Q PE units.

As illustrated in FIG. 2, the method for processing sparse data includes the following steps.

At S201, a sparse weight matrix to be calculated is divided into at least one unit block.

At S202, the at least one unit block is grouped into at least one computing group.

At S203, an effective weight address corresponding to each effective weight in the computing group is obtained.

The above steps at S201 to S203 are the same as the steps at S101 to S103 in the method for processing sparse data according to the first embodiment, the description is not repeated here.

Compared to the method for processing sparse data according to the first embodiment, the method for processing sparse data according to the second embodiment further includes steps at S240 and S250.

At S204, a convolution computation value is read.

In an embodiment, an effective weight corresponding to an effective weight address and a storage address where the effective weight is located in the non-sparse weight matrix may be obtained according to the effective weight address of each computing group in the sparse weight matrix, through the P×Q PE units in the PE array. According to the storage address of the effective weight in the non-sparse weight matrix, the convolution computation value corresponding to the effective weight is read.

At S205, convolution computation or fully connected layer computation is performed.

In an embodiment, the convolution computation or fully-connected layer computation in the neural network model based on deep learning may be performed according to the convolution computation value corresponding to the effective weight in each computing group.

Figure 3:
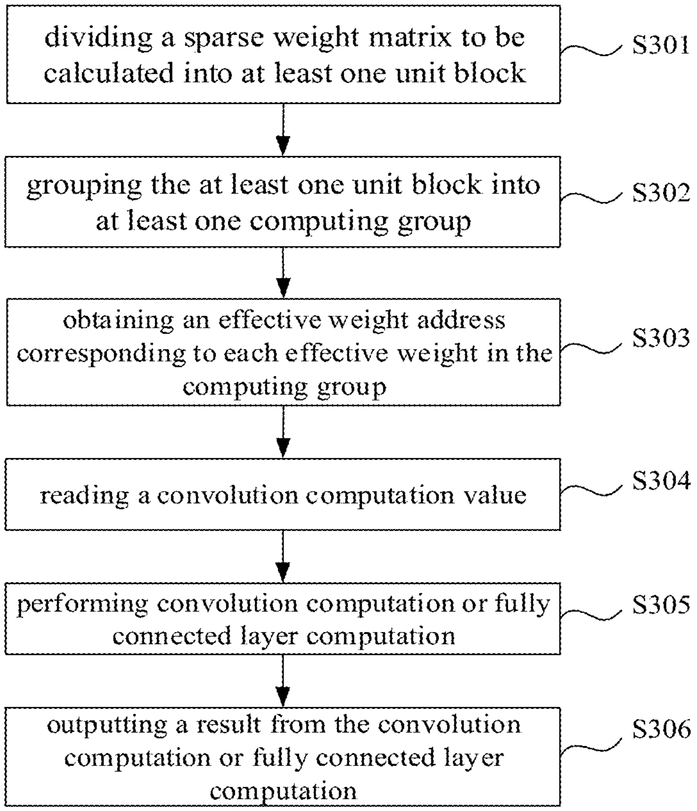
FIG. 3 is a flowchart of a method for processing sparse data in accelerating operation of a reconfigurable processor according to a third embodiment of the disclosure.

FIG. 3 is a flowchart of a method for processing sparse data in accelerating operation of a reconfigurable processor according to a third embodiment of the disclosure. The reconfigurable processor includes a PE array, where the PE array includes P×Q PE units.

As illustrated in FIG. 3, the method for processing sparse data includes the following steps.

At S301, a sparse weight matrix to be calculated is divided into at least one unit block.

At S302, the at least one unit block is grouped into at least one computing group.

At S303, an effective weight address corresponding to each effective weight in the computing group is obtained.

At S304, a convolution computation value is read.

At S305, convolution computation or fully connected layer computation is performed.

The steps at S301 to S305 are the same as the steps at S201 to S205 in the method for processing sparse data according to the second embodiment, the description is not repeated here.

Compared to the method for processing sparse data according to the second embodiment, the method for processing sparse data according to the third embodiment further includes a step at S306.

At S306, a result from the convolution computation or fully-connected layer computation is output.

In an embodiment, the result from the convolution computation or fully-connected layer computation in the neural network model may be output.

Figure 4:
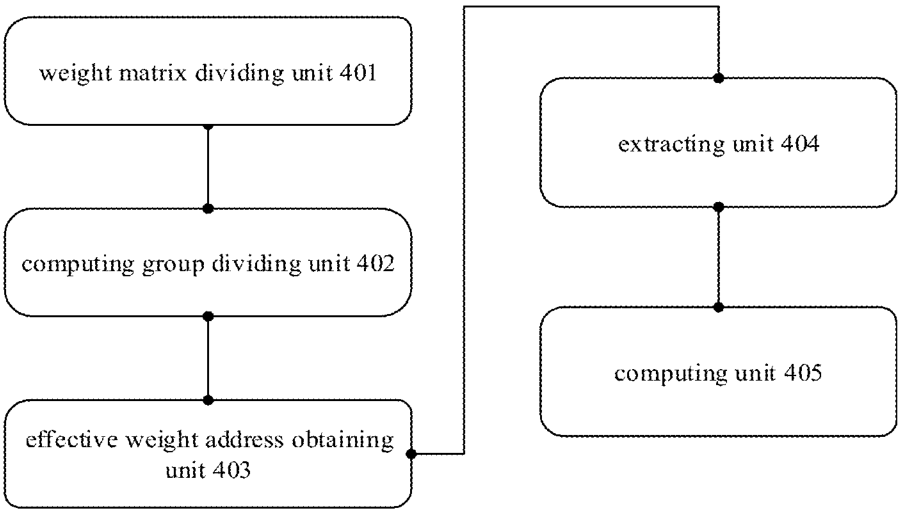
FIG. 4 is a schematic diagram of an apparatus for processing sparse data in accelerating operation of a reconfigurable processor according to an embodiment of the disclosure.

FIG. 4 is a schematic diagram of an apparatus for processing sparse data in accelerating operation of a reconfigurable processor according to an embodiment of the disclosure. The reconfigurable processor includes a PE array, where the PE array includes P×Q PE units.

As illustrated in FIG. 4, the apparatus for processing sparse data in accelerating operation of a reconfigurable processor includes: a weight matrix dividing unit 401, a computing group dividing unit 402 and an effective weight address obtaining unit 403.

The weight matrix dividing unit 401 is configured to divide a sparse weight matrix to be calculated into at least one unit block.

In an embodiment, the weight matrix dividing unit 401 is configured to group the sparse weight matrix into the at least one unit block by taking P×Q as a division unit in a row direction and a column direction of the sparse weight matrix, where each unit block includes at least one effective weight.

The computing group dividing unit 402 is configured to group the at least one unit block into at least one computing group.

In an embodiment, the computing group dividing unit 402 may be configured to: group the at least one unit block in the sparse weight matrix into the at least one computing group in a column direction of the sparse weight matrix, in which each group includes at least one unit block; determine whether a total number of effective weights in each group is more than (P×Q)/2; in response to the total number of effective weights in each group being more than (P×Q)/2, split the group into two groups evenly in the column direction of the sparse weight matrix; repeat the above determining and splitting steps until the total number of effective weights in each group in the sparse weight matrix is less than (P×Q)/2; and obtain a minimum number of unit blocks included in each group in the sparse weight matrix as a group division number n, and divide the sparse weight matrix in the column direction of the sparse weight matrix into the at least one computing group according to n.

The effective weight address obtaining unit 403 is configured to obtain an effective weight address corresponding to each effective weight in the computing group.

In an embodiment, the effective weight address obtaining unit 403 is further configured to: read each effective weight in the computing group sequentially by the PE array; and determine a number of zero weights between a current effective weight and a previous effective weight as an effective weight address of the current effective weight, and store the number of zero weights into a storage address corresponding to the current effective weight of the computing group.

In an embodiment, the apparatus for processing sparse data further includes an extracting unit 404 and a computing unit 405, indicated by dotted lines in FIG. 4.

The extracting unit 404 is configured to read a convolution computation value.

In an embodiment, the extracting unit 404 is configured to: obtain an effective weight corresponding to the effective weight address and a storage address of the effective weight in a non-sparse weight matrix according to the effective weight address of each computing group of the sparse weight matrix through the P×Q PE units in the PE array; and read the convolution computation value corresponding to the effective weight according to the storage address of the effective weight in the non-sparse weight matrix.

The computing unit 405 is configured to perform convolution computation or fully connected layer computation.

In an embodiment, the computing unit 405 is configured to perform convolution computation or fully connected layer computation in a neural network model based on deep learning according to the convolution computation value corresponding to the effective weight in each computing group.

In an embodiment, the apparatus for processing sparse data further includes an outputting unit (not shown).

The outputting unit is configured to output a result from the convolution computation or fully-connected layer computation.

In an embodiment, the outputting unit is configured to output the result from the convolution computation or fully-connected layer computation in the neural network model.

In an embodiment, the P×Q PE units in the PE array are 8×8 PE units.

It should be understood that although this specification is described in each embodiment, not each embodiment only contains an independent technical solution. This narration in the specification is only for clarity, and those skilled in the art should regard the specification as an overall, the technical solution in the embodiments may also be appropriately combined to generate other implementations that can be understood by those skilled in the art.

The series of detailed descriptions listed above are only specific descriptions of feasible implementations of the disclosure, which are not intended to limit the protection scope of the disclosure. Any equivalent implementations or changes made without departing from the technical spirit of the disclosure shall be included in the protection scope of the disclosure.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

What is claimed is:

1. A method for processing sparse data, performed by a reconfigurable processor, wherein the reconfigurable processor comprises a processing element (PE) array, and the PE array comprises P×Q PE units, the method comprising:

- dividing a sparse weight matrix to be calculated into at least one unit block;
- grouping a plurality of unit blocks into a computing group; and
- obtaining an effective weight address corresponding to each effective weight in the computing group;
- wherein grouping the plurality of unit blocks into the computing group comprises:
  - grouping the plurality of unit blocks in the sparse weight matrix into a computing group in a column direction of the sparse weight matrix;
  - determining whether a total number of effective weights in the computing group is more than (P×Q)/2;
  - in response to the total number of effective weights in the computing group being more than (P×Q)/2, splitting the computing group into two computing groups evenly in the column direction of the sparse weight matrix;
  - repeating the above determining and splitting until the total number of effective weights in each computing group is less than (P×Q)/2; and
  - determining a minimum number of unit blocks included in each computing group in the sparse weight matrix as a group division number n, and dividing the sparse weight matrix in the column direction into a plurality of computing groups according to n.

2. The method of claim 1, wherein dividing the sparse weight matrix to be calculated into at least one unit block comprises:

- dividing the sparse weight matrix into the at least one unit block by taking P×Q unit blocks as a division unit in a row direction and a column direction of the sparse weight matrix, wherein each unit block comprises at least one effective weight.

3. The method of claim 1, wherein obtaining the effective weight address corresponding to each effective weight in the computing group comprises:

- reading each effective weight in the computing group sequentially by the PE array; and
- determining a number of zero weights between a current effective weight and a previous effective weight as an effective weight address of the current effective weight, and storing the number of zero weights into a storage address corresponding to the current effective weight of the computing group.

4. The method of claim 1, further comprising:

reading a convolution computation value; and performing convolution computation or fully connected layer computation.

5. The method of claim 4, wherein reading the convolution computation value comprises:

obtaining an effective weight corresponding to an effective weight address and a storage address of the effective weight in a non-sparse weight matrix according to the effective weight address of each computing group of the sparse weight matrix through the P×Q PE units in the PE array; and reading the convolution computation value corresponding to the effective weight according to the storage address of the effective weight in the non-sparse weight matrix.

6. The method of claim 4, wherein performing convolution computation or fully connected layer computation comprises:

performing convolution computation or fully connected layer computation in a neural network model based on deep learning according to the convolution computation value corresponding to the effective weight in each computing group.

7. The method of claim 1, wherein the P×Q PE units in the PE array are 8×8 PE units.

8. An apparatus for processing sparse data, comprising:

a reconfigurable processor comprising a PE array, in which the PE array comprises P×Q PE units; and a memory configured to store instructions executable by the reconfigurable processor;

wherein when the instructions are executed by the reconfigurable processor, the reconfigurable processor is configured to;

divide a sparse weight matrix to be calculated into at least one unit block;

group a plurality of unit blocks into a computing group; and obtain an effective weight address corresponding to each effective weight in the computing group;

wherein the reconfigurable processor is further configured to:

group the plurality of unit blocks in the sparse weight matrix into a computing group in a column direction of the sparse weight matrix;

determine whether a total number of effective weights in the computing group is more than (P×Q)/2;

in response to the total number of effective weights in the computing group being more than (P×Q)/2, split the computing group into two computing groups evenly in the column direction of the sparse weight matrix;

repeat the above determining and splitting until the total number of effective weights in each computing group is less than (P×Q)/2; and determine a minimum number of unit blocks included in each computing group in the sparse weight matrix as a group division number n, and divide the sparse weight matrix in the column direction into a plurality of computing groups according to n.

9. The apparatus of claim 8, wherein the reconfigurable processor is further configured to:

divide the sparse weight matrix into the at least one unit block by taking P×Q unit blocks as a division unit in a row direction and a column direction of the sparse weight matrix, wherein each unit block comprises at least one effective weight.

10. The apparatus of claim 9, wherein the reconfigurable processor is further configured to:

read each effective weight in the computing group sequentially by the PE array; and determine a number of zero weights between a current effective weight and a previous effective weight as an effective weight address of the current effective weight, and storing the number of zero weights into a storage address corresponding to the current effective weight of the computing group.

11. The apparatus of claim 8, wherein the reconfigurable processor is further configured to:

read a convolution computation value; and perform convolution computation or fully connected layer computation.

12. The apparatus of claim 11, wherein the reconfigurable processor is further configured to:

obtain an effective weight corresponding to an effective weight address and a storage address of the effective weight in a non-sparse weight matrix according to the effective weight address of each computing group of the sparse weight matrix through the P×Q PE units in the PE array; and read the convolution computation value corresponding to the effective weight according to the storage address of the effective weight in the non-sparse weight matrix.

13. The apparatus of claim 11, wherein the reconfigurable processor is further configured to:

perform convolution computation or fully connected layer computation in a neural network model based on deep learning according to the convolution computation value corresponding to the effective weight in each computing group.

14. The apparatus of claim 8, wherein the P×Q PE units in the PE array are 8×8 PE units.

* * * * *